US 6,422,069 B1

(12) United States Patent
Shimizu et al.

(10) Patent No.: US 6,422,069 B1
(45) Date of Patent: Jul. 23, 2002

(54) SELF-EXCITING AND SELF-DETECTING PROBE AND SCANNING PROBE APPARATUS

(75) Inventors: Nobuhiro Shimizu; Yoshiharu Shirakawabe; Hiroshi Takahashi; Chiaki Yasumuro; Tadashi Arai, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/526,148

(22) Filed: Mar. 15, 2000

(30) Foreign Application Priority Data

Mar. 16, 1999 (JP) .......................................... 11-070923
Jan. 27, 2000 (JP) ........................................ 2000-019217

(51) Int. Cl.[7] ............................ G01B 5/28; G01B 7/34; G01N 13/16
(52) U.S. Cl. ...................................................... 73/105
(58) Field of Search ............................ 73/105; 250/306

(56) References Cited

U.S. PATENT DOCUMENTS 5,386,720 A * 2/1995 Toda et al. .................... 73/105
5,483,822 A * 1/1996 Albrecht et al. ............... 73/105
5,856,672 A * 1/1999 Ried ........................... 250/306

OTHER PUBLICATIONS

Manalis, S. R. et al., "Atomic Force Microscopy for High Speed Imaging Using Cantilevers with an Integrated Actuator and Sensor", Appl. Phys. Lett., vol. 68, No. 6, Feb. 5, 1996, pp. 871–873.*

Minne, S. C. et al., "Parallel Atomic Force Microscopy Using Cantilevers with Integrated Piezoresistive Sensors and Integrated Piezoelectric Actuators" Appl. Phys. Lett., vol. 67, No. 26, Dec. 25, 1995, pp. 3918–3920.*

Tortonese, M. et al., "Atomic Force Microscopy Using A Piezoresistive Cantilever", Transducers '91, 1991 International Conference on Solid–State Sensors and Actuators, Digest of Technical Papers, IEEE, 1991, pp. 448–451.*

Tortonese, M. et al., "Atomic Resolution with an Atomic Force Microscope Piezoresistive Detection", Appl. Phys. Lett., vol. 62, No. 08, Feb. 22, 1993, pp. 834–836.*

* cited by examiner

Primary Examiner—Daniel S. Larkin
(74) Attorney, Agent, or Firm—Adams & Wilks

(57) ABSTRACT

A scanning probe apparatus and a self-exciting cantilever probe therefor are provided for measuring a characteristic of a sample by scanning a lever of the probe across the sample surface. The probe has a deflectable lever extending from a base and formed integrally therewith, and a resistive body provided on the lever to excite the lever in response to a periodic bias signal applied to the resistive body. In addition, the resistive body has a resistance value that varies in response to deflection of the lever so that the resistance of the resistive body may be monitored to detect deflection of the lever.

15 Claims, 8 Drawing Sheets

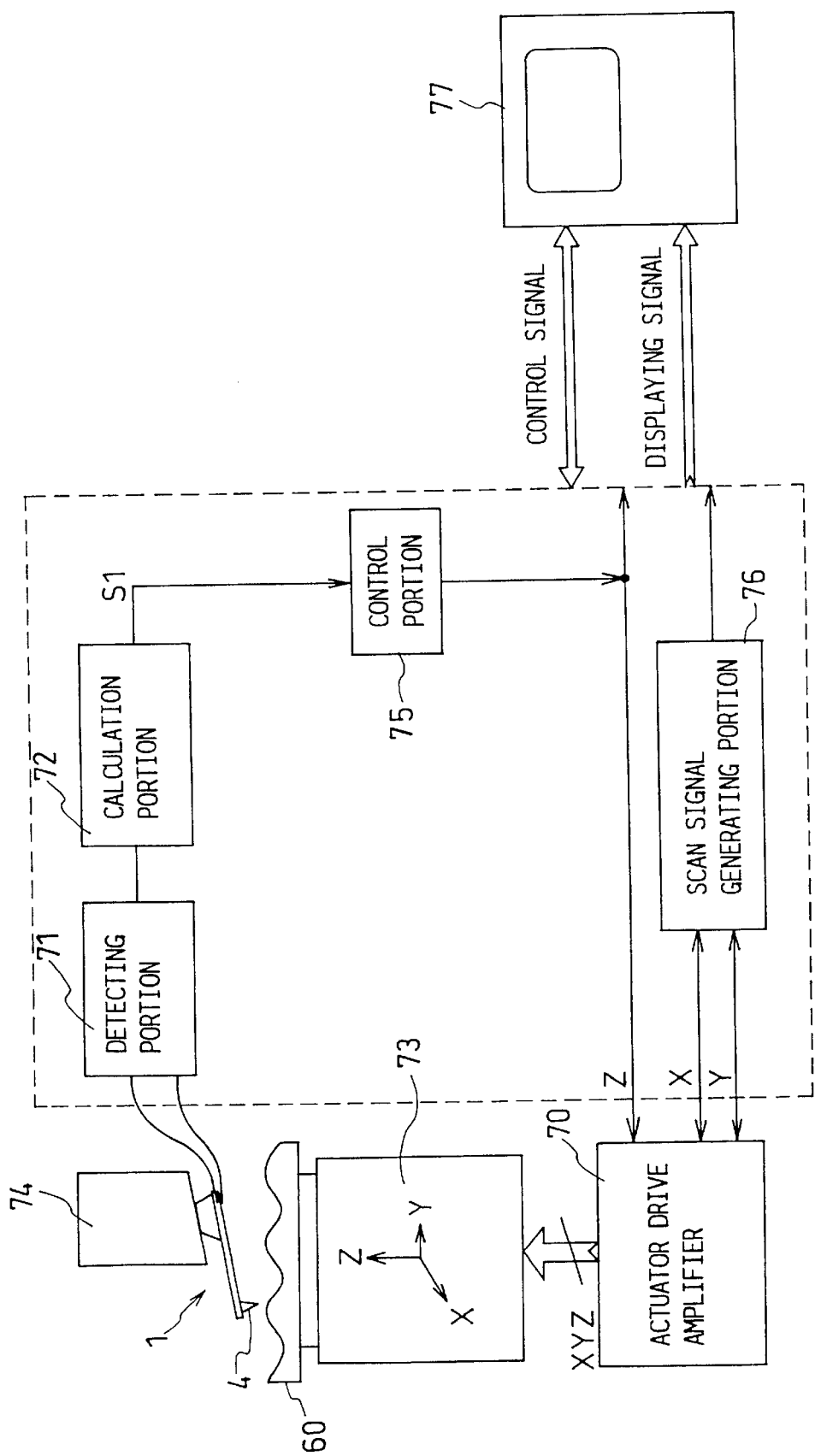

SELF-EXCITING AND SELF-DETECTING PROBE AND SCANNING PROBE APPARATUS

BACKGROUND OF THE INVENTION

1. Field of the Invention

The present invention relates to a self-exciting and self-detecting probe suitable for use in a DFM mode in which a lever of the probe is vibrated for operation and a scanning probe apparatus utilizing the same.

2. Description of the Related Art

When a surface configuration of a sample is to be measured using a scanning probe microscope for example, a dynamic measurement mode has been widely used in which configuration data on the sample surface is obtained by causing resonance at a cantilever of the probe to tap the sample surface lightly, and controlling the position of the cantilever in a Z-direction by with servo system on a feedback basis to achieve uniform tapping.

Therefore, when a sample is measured in the dynamic measurement mode, configurations have been used in which a piezoelectric body, such as PZT, is coupled to a cantilever body through physical contact to excite the cantilever.

Measurement data has been then obtained by vibrating the cantilever with a voltage signal applied to the piezoelectric body, applying a DC bias to a resistive body mounted in the vicinity of a base portion of the cantilever to obtain a detection signal in accordance with deflection of the cantilever, and extracting the detecting signal through a differential amplifier.

Thus, in conventional configurations, a cantilever is externally excited using a piezoelectric body. This has resulted in a problem is that transmission of vibrations tends to become unstable depending on the state of mechanical coupling between a piezoelectric body and a cantilever and in that the provision of an additional piezoelectric body makes the configuration of an apparatus complicated.

Further, since deflection of a cantilever has been detected by applying a DC bias to a resistive body used as a distortion sensor and by detecting a resultant change in a voltage as the deflection of the cantilever, sensitivity has been poor, and accurate measurement has not been possible because of significant variations attributable to the mounting state.

An operating point is present in the vicinity of a resonance frequency of a cantilever, and it is therefore difficult to achieve reproducibility of the operating point because of variations of the characteristics of the cantilever, which has resulted in another problem in that a stable operation can not be expected.

It is an object of the invention to provide a self-exciting and self-detecting probe in which the above-described problems with the prior art can be solved and a scanning probe apparatus utilizing the same.

SUMMARY OF THE INVENTION

In order to solve the above-described problem, according to the invention, there is provided a scanning probe apparatus for measuring a sample by vibrating a lever of a probe, characterized in that a probe having a resistive body provided on the lever thereof is used and in that a periodic bias signal is applied to the resistive body to vibrate the lever.

The resistive body may be provided by doping the lever with an impurity by means of ion implantation. Variations in the transmission of vibrations can be eliminated to achieve more stable excitation compared to excitation using an externally attached piezoelectric body. The period of the bias signal can be arbitrarily chosen, which makes it easier to set an operating point different from the resonance point of the lever.

In the above-described configuration, the resistive body may be used as a detecting element for detecting distortion of the lever.

The above-described configuration may be modified by providing a separate detecting element for detecting distortion of the lever in addition to the resistive body.

In the above-described configuration, a reference resistive body having the same configuration as the resistive body may be provided in the vicinity of the lever, and the reference resistive body may be used for temperature compensation for detecting distortion of the lever.

When the reference resistive body is used for temperature compensation during the detection of distortion of the lever, a configuration may be employed in which the same AC bias is applied to both of the reference bodies.

If a bias signal having a periodically changing amplitude, such as an alternating current, is used to detect distortion of the lever, the detection can be carried out with a preferable signal-to-noise ratio, and highly accurate measurement can be performed according to various wave detecting methods using components such as amplitudes, phases, and frequencies. This makes it possible to detect signals at low levels and to provide a scanning probe apparatus capable of measurement with high resolution and accuracy.

BRIEF DESCRIPTION OF THE DRAWINGS

FIG. 8 is a block diagram showing a configuration of a scanning probe apparatus.

DETAILED DESCRIPTION OF PREFERRED EMBODIMENTS

An embodiment of the present invention will now be described in detail with reference to the drawings.

Figure 1:
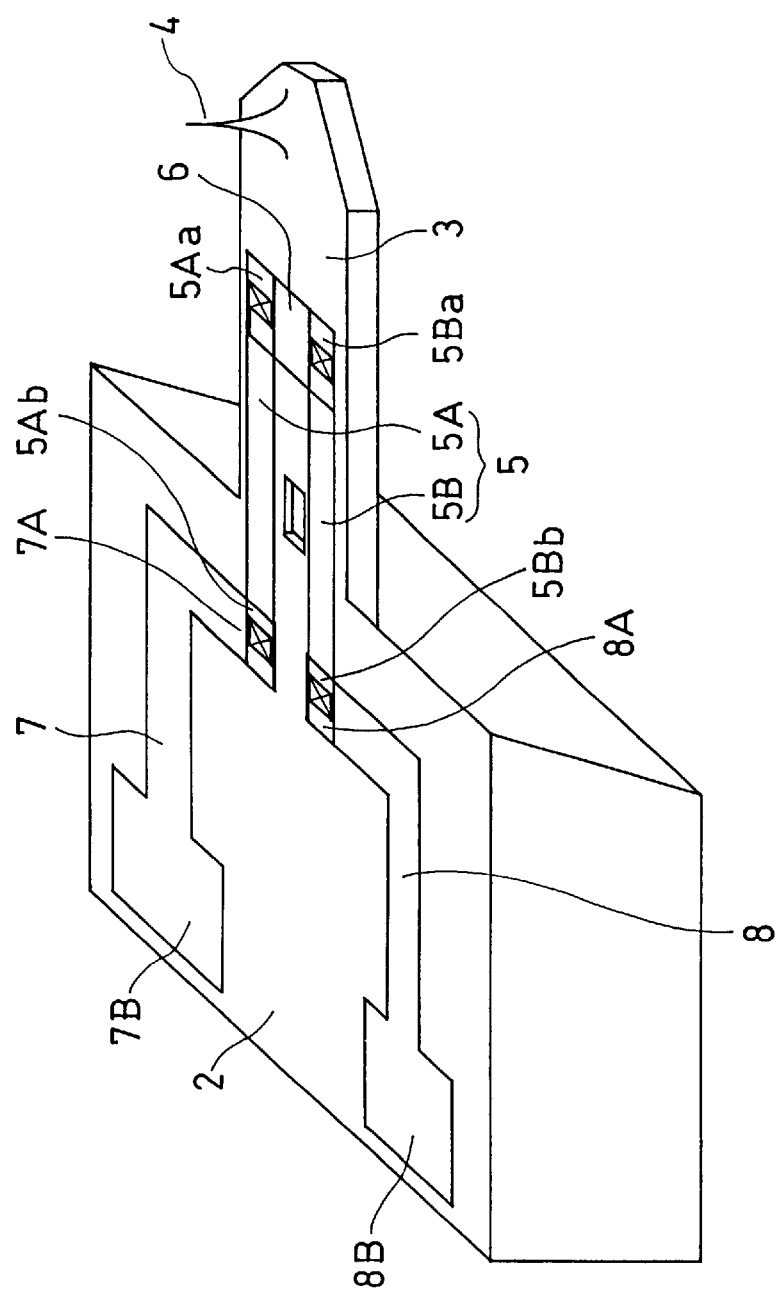
FIG. 1 is a perspective view of an embodiment of a self-exciting and self-detecting probe according to the invention.

FIG. 1 shows an embodiment of a self-exciting and self-detecting probe according to the invention. A probe 1 shown in FIG. 1 is configured as a probe to be used in a scanning probe microscope and can be manufactured, for example, using photolithography employing an SOI wafer or the like. The probe 1 is constituted by a lever 3 integrally extending from a support portion 2 formed by etching an SOI wafer, and a scanning needle 4 is provided at a free end of the lever 3 such that it is integral with the lever 3. The scanning needle 4 may be a body which is separate from the lever 3. The lever 3 may be configured without the scanning needle 4.

A resistive body 5 is provided in the vicinity of a base portion of the lever 3. In the present embodiment, the resistive body 5 is formed by a pair of resistive elements 5A and 5B provided such that they extend in the longitudinal direction of the lever 3, and ends 5A*a* and 5B*a* of the respective resistive elements 5A and 5B are electrically connected by a metal wire 6. As will be described later, the resistive elements 5A and 5B are provided for exciting the lever 3 and detecting distortion of the lever 3. The resistive elements 5A and 5B are formed in a band-like configuration having a constant width by doping the lever 3 with an impurity (boron, phosphorus, or the like) by means of ion implantation or the like.

A pair of metal wires 7 and 8 in the form of thin films are deposited on the support portion 2 of the probe 1, and ends 7A and 8A of the respective metal wires 7 and 8 are electrically connected to other ends 5A*b* and 5B*b* of the resistive elements 5A and 5B. Other ends 7B and 8B of the respective metal wires 7 and 8 are terminal portions to allow a configuration in which the resistive elements 5A and 5B can be electrically connected to an external circuit through the ends 7B and 8B.

In the present embodiment, any of the metal wires 6, 7, and 8 are formed as a metal film using aluminum.

Since the probe 1 has the above-described configuration, the probe 1 may be used in a dynamic measurement mode in which it is set in a scanning probe microscope and in which measurement is carried out by vibrating the lever 3. Specifically, when a voltage signal having a periodically changing level, e.g., an AC voltage current is applied between the ends 7B and 8B as an excitation voltage signal KV as an electrical energy for excitation, an AC current that flows through the resistive body 5 in response to the excitation voltage signal KV causes the lever 3 to displace (vibrate) at a frequency f1 which is the same frequency as that of the excitation voltage signal KV.

Figure 2A:
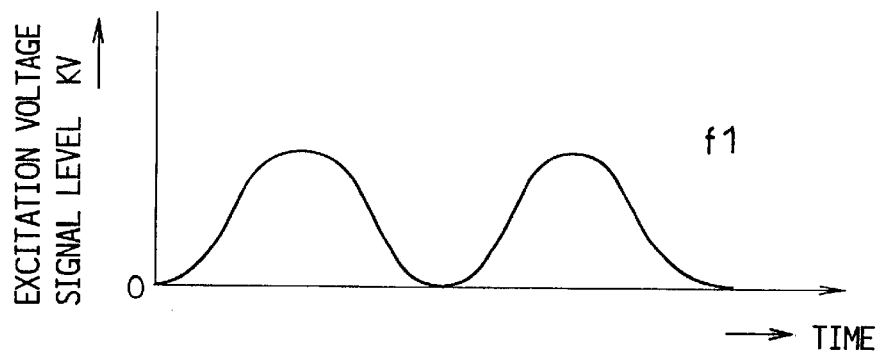
FIGS. 2A through 2D are graphs showing examples of operations of the probe shown in FIG. 1.
Figure 2B:
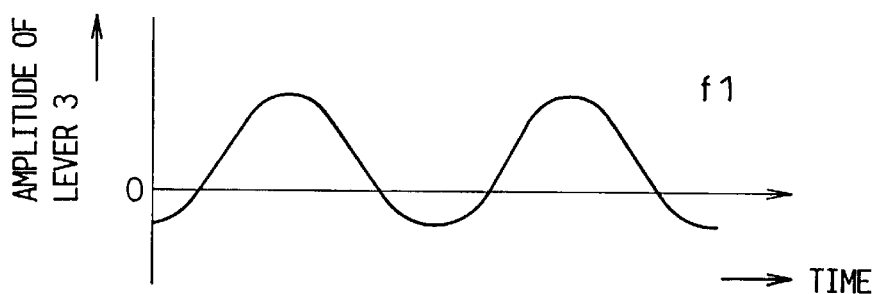

FIGS. 2A and 2B show an example of an operation of the probe 1. While the excitation voltage signal KV is a signal in the form of a sine wave whose level periodically changes between 0 and Va volts in the example shown in FIGS. 2A through 2D, a voltage signal in the form of a triangular wave, a rectangular wave, or the like may obviously be used instead. Regardless of the form of the excitation voltage signal KV, displacement of the lever 3 can be caused in accordance with periodic changes in the excitation voltage signal KV to allow self-excitation of the lever 3. The amplitude of the vibration of the lever 3 can be adjusted by the voltage level of the excitation voltage signal KV.

Since the probe 1 is a self-exciting type in which the lever 3 is excited by applying a voltage signal for excitation to the resistive body 5 formed as described above, the excitation can be controlled with higher controllability than in conventional configurations for external excitation, which makes it possible to eliminate variation of the transmission of vibrations, thereby allowing excitation of the lever 3 with high accuracy and preferable reproducibility. As a result, signal detection can be performed with high sensitivity and accuracy.

Since the period of vibration of the lever 3 is determined by the frequency of the excitation voltage signal KV, it may be any frequency other than the resonance frequency of the lever 3. However, this frequency is preferably a value in the vicinity of the resonance point of the lever 3 to allow the lever 3 to have a greater amplitude which provides improved detection sensitivity.

In the probe 1, the resistive body 5 is also used for detecting distortion of the lever 3. This is utilization of the fact that the resistance of the resistive body 5 change in accordance with distortion of the lever 3, and a circuit for measuring the resistance of the resistive body 5 is connected between the ends 7B and 8B of the respective metal wires 7 and 8. The circuit for measuring the resistance of the resistive body 5 may be similar to those used for conventional self-detecting probes.

Figure 2C:
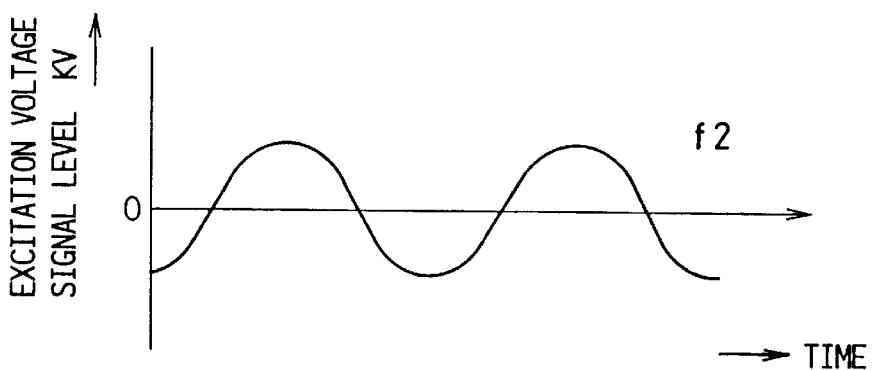
Figure 2D:
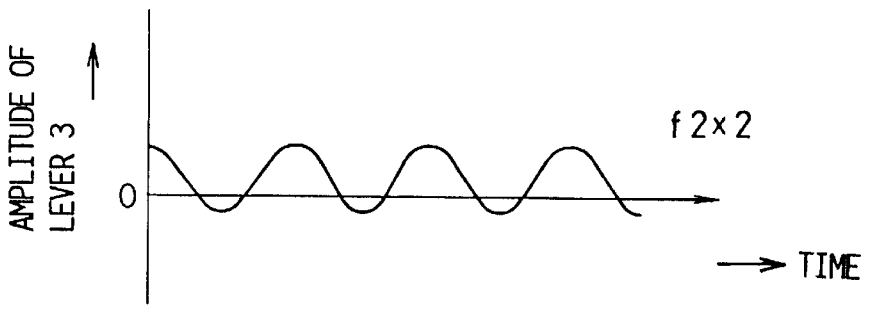

The vibration frequency of the lever 3 is changed by a frequency offset of the excitation voltage signal KV. For example, an operation is possible in which the excitation voltage signal KV has a frequency f2 as shown in FIG. 2C and the vibration frequency of the lever 3 is 2×f2 as shown in FIG. 2D. However, an operation in which the frequency of the excitation voltage signal KV is the same as the vibration frequency of the lever 3 is preferred because the mode of operation shown in FIGS. 2A and 2B allows simpler detection of distortion based on a signal from the resistive body 5.

Figure 3:
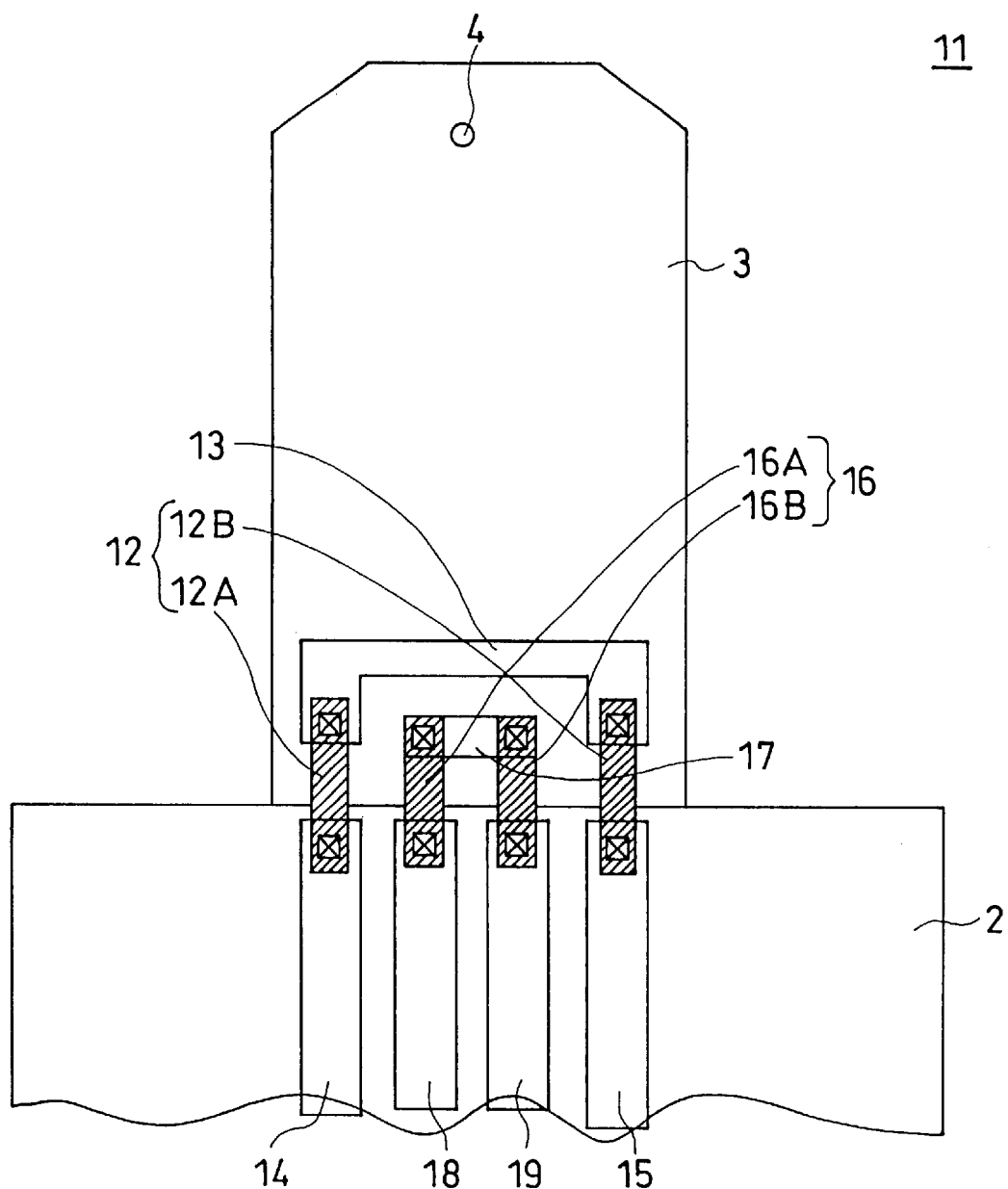
FIG. 3 is an enlarged plan view of a major part of another embodiment of a self-exciting and self-detecting probe according to the invention.

FIG. 3 shows another embodiment of a self-exciting and self-detecting probe according to the invention. A probe 11 shown in FIG. 3 has the same basic configuration as that of the probe 1 shown in FIG. 1 except that an excitation resistive body for exciting a lever 3 and a displacement-detecting resistive body for detecting distortion (displacement) of the lever 3 are provided separately. Therefore, parts of the probe 11 having corresponding parts in the probe 1 are indicated by like reference numbers and will not be described here.

In FIG. 3, 12 represents an excitation resistive body formed by excitation resistive elements 12A and 12B; 13, 14, and 15 represent metal wires for connection; 16 represents a detecting resistive body formed by detecting resistive elements 16A and 16B; and 17, 18, and 19 represent metal wires for connection. They are fabricated similarly to the resistive body 5 and metal wires 6, 7, and 8 shown in FIG. 1 using the same fabrication techniques.

Since the excitation resistive body 12 and the detecting resistive body 16 are provided as separate bodies in the probe 11 as described above, an excitation voltage signal KV can be externally applied to the metal wires 14 and 15 to excite the lever 3, and resultant displacement of the lever 3 can be electrically detected by a detection circuit connected to the metal wires 18 and 19. The detection circuit connected to the metal wires 18 and 19 may be any of well known circuits which are used in conventional self-detecting probes.

Figure 4:
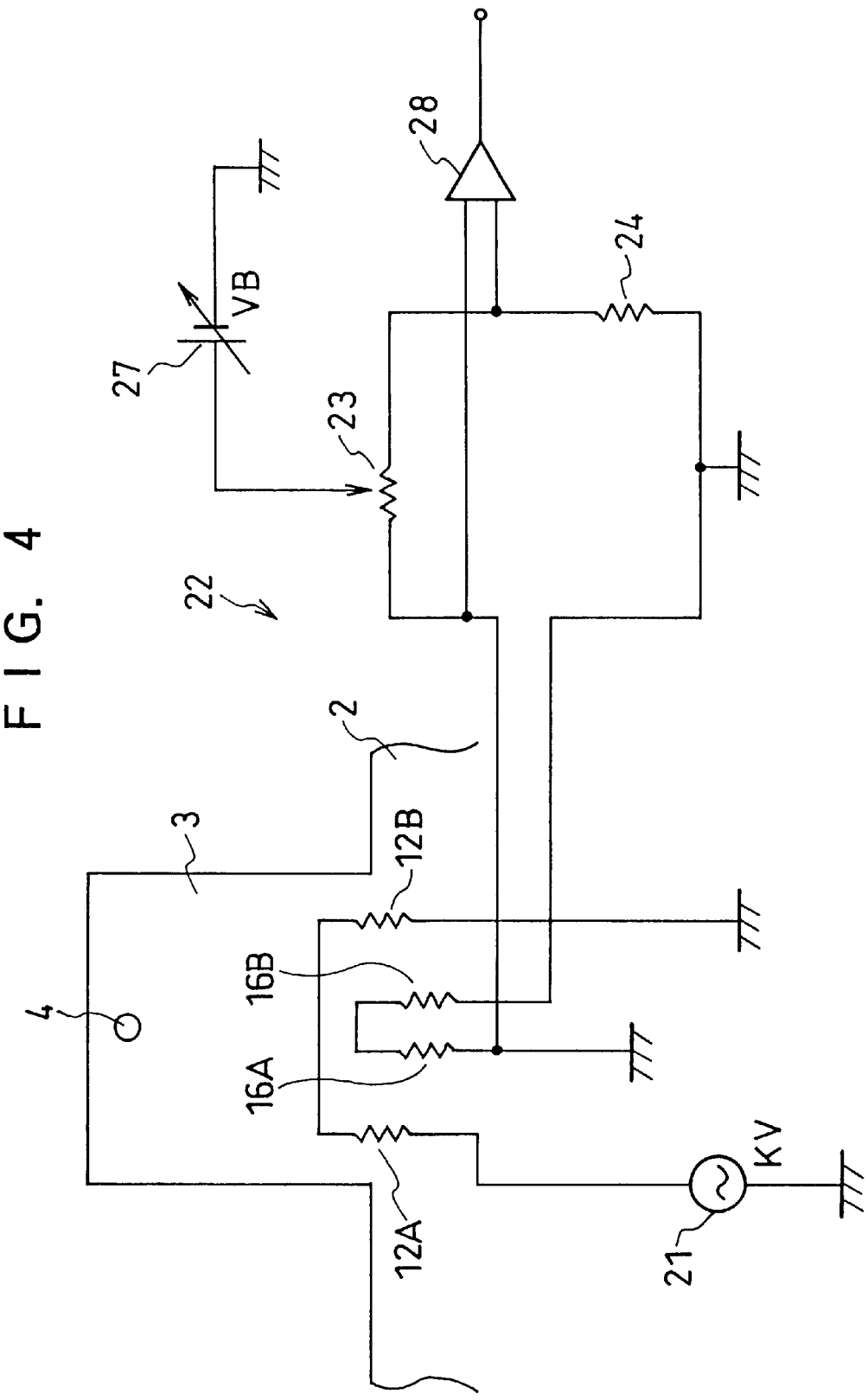
FIG. 4 is a diagram showing an example of a circuit configuration for causing self-excitation of the probe shown in FIG. 3 and for detecting resultant displacement of a lever.

FIG. 4 shows an example of a configuration of a circuit for causing self-excitation of the probe 11 and for detecting resultant displacement of the;lever 3. In FIG. 4, 21 represents a voltage generator for applying the excitation voltage signal KV for excitation to the excitation resistive elements 12A and 12B of the excitation resistive body 12, and the reference number 22 generally represents a displacement detection circuit connected to the detecting resistive elements 16A and 16B of the detecting resistive body 16 for detecting displacement of the lever 3 from changes in the resistance of the detecting resistive elements 16A and 16B.

The displacement detection circuit 22 has resistors 23 and 24 which form a bridge circuit with the detecting resistive elements 16A and 16B. The resistor 23 is a variable resistor, and a DC voltage VB is supplied from a separate variable voltage source 27 for biasing between a variable contact of the same and the ground. The voltage across the resistor 23 is input to a differential amplifier 28, and a voltage signal indicating displacement of the lever 3 is obtained at the output of the differential amplifier 28.

Figure 5:
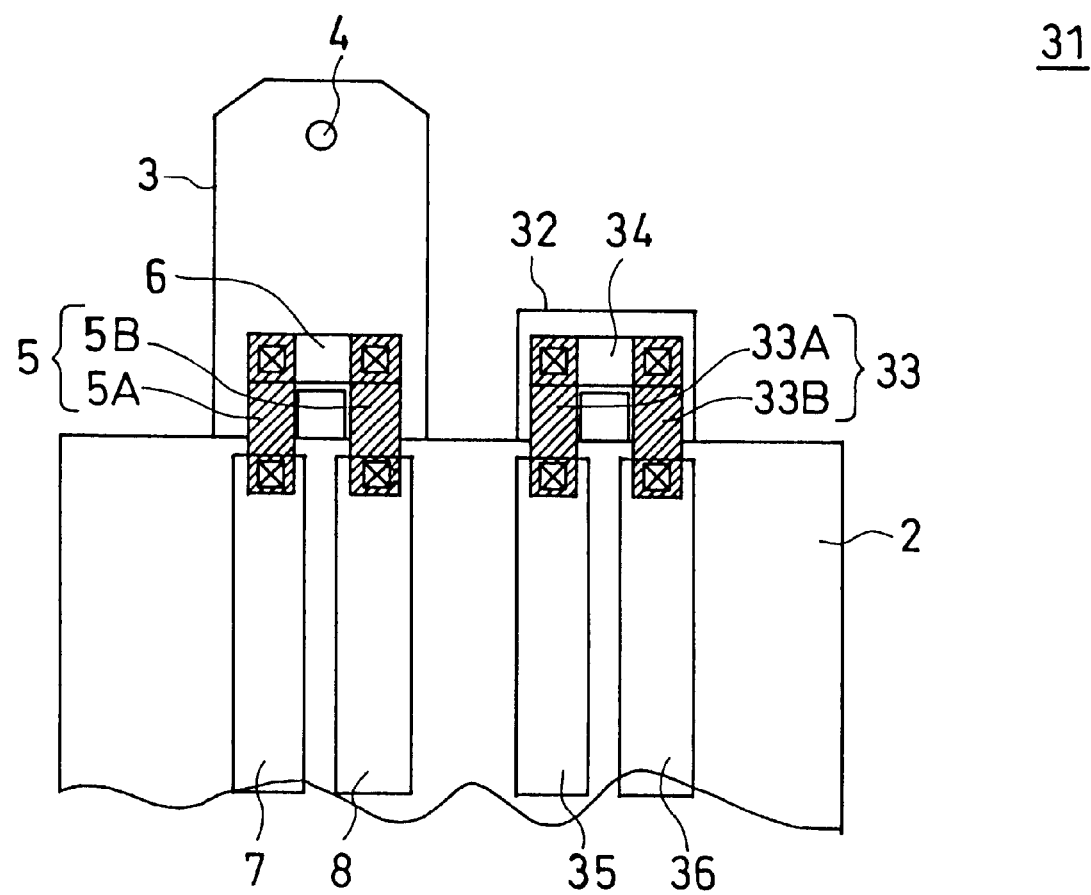
FIG. 5 is an enlarged plan vie w of a major part of a modification of the probe shown in FIG. 1.

FIG. 5 shows a modification of the probe 1 shown in FIG. 1. A probe 31 shown in FIG. 5 is different from the probe 1 in that a reference lever 32 is provided at a support portion 2 and in that a reference resistive body 33 is provided at the reference lever 32. The reference resistive body 33 is configured similarly to the resistive body 5 and is formed by resistive elements 33A and 33B which are connected by metal wires 34, 35, 36.

Since the probe 31 has the reference resistive body 33, the use of the same makes it possible to detect displacement of the lever 3 accurately with the effect of thermal drifts of the reference resistive body 33 eliminated. The position of the reference lever 32 is not limited to the position shown in FIG. 5.

Figure 6:
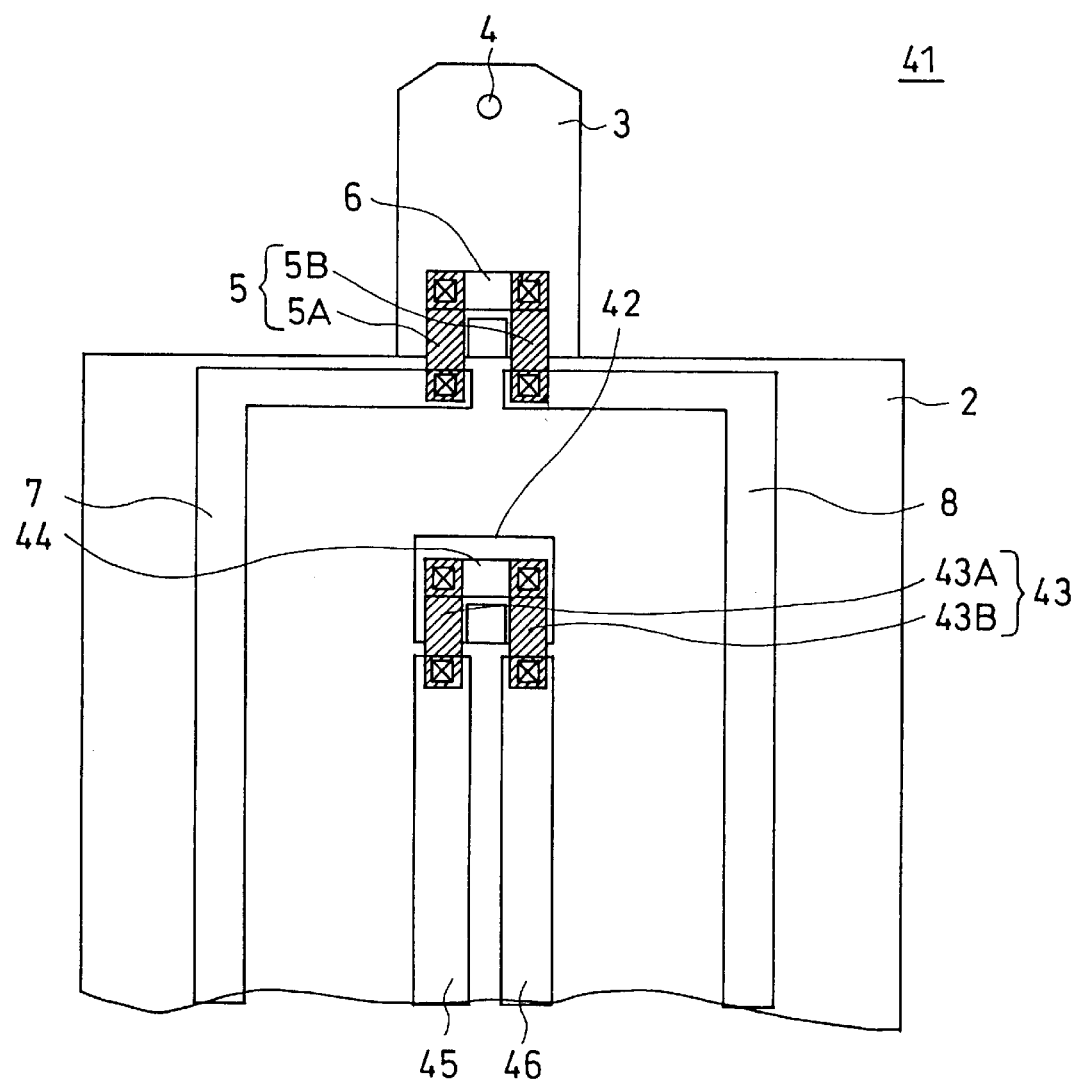
FIG. 6 is an enlarged plan view of a major part of a modification of the probe shown in FIG. 5.

FIG. 6 shows an example of a configuration in which the reference lever is provided in a support portion 2. Referring to FIG. 6, in a probe 41, a reference lever 42 is provided in a support portion 2; a reference resistive body 43 formed by resistive elements 43A and 43B is formed on the reference lever 42; and metal wires 44, 45, 46 are formed. The probes 31 and 41 are different in that the reference lever 42 is subjected to substantially no vibration while the reference lever 32 vibrates similarly to the lever 3 when the latter vibrates.

Figure 7:
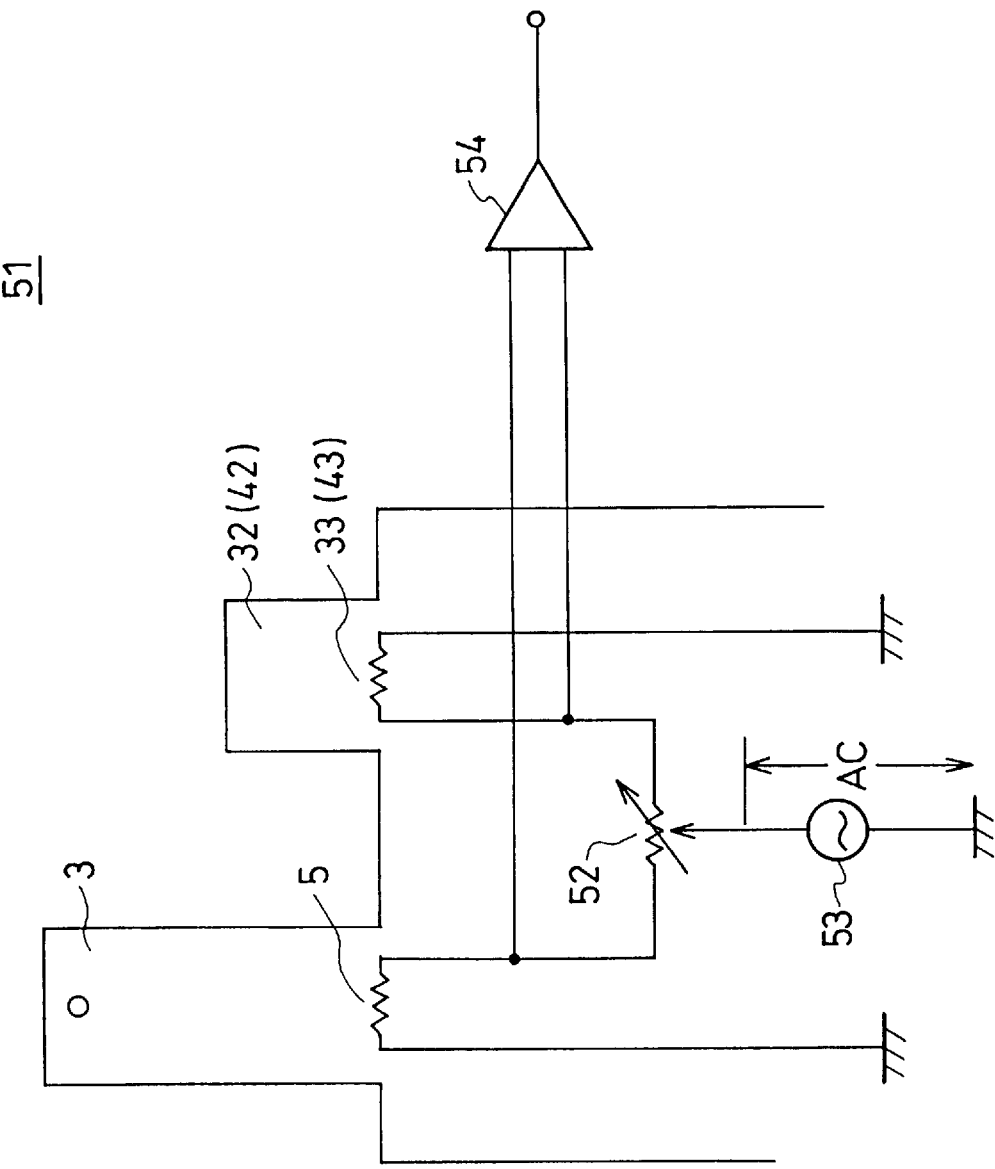
FIG. 7 is a circuit diagram of an example of a circuit configuration for detecting displacement of a lever in the probes shown in FIGS. 5 and 6.

FIG. 7 shows an example of a circuit configuration for detecting displacement of the lever 3 in the probe 31 or 41 having the reference resistive body 33 or 34 as shown in FIGS. 5 and 6.

A detection circuit 51 has a variable resistor 52 connected between a resistive body 5 and a reference resistive body 33, and one end of each of the resistive body 5 and reference resistive body 33 is grounded to configure a resistance bridge circuit formed by the resistive body 5, reference resistive body 33, and variable resistor 52. An AC voltage AC for a bias signal is applied between a movable contact of the variable resistor 52 and the ground by an AC power source 53. The voltage across the variable resistor 52 is input to a differential amplifier 54, and a voltage signal indicating displacement of the lever 3 is obtained at the output of the differential amplifier 54.

In the above-described circuit configuration, since the same resistance drifts as caused at the resistive body 5 by temperature changes occur at the reference resistive body 33, those drifts are cancelled at the input of the differential amplifier 54. Therefore, only voltage changes caused at the resistive body 5 by displacement of the lever 3 are obtained at the output of the differential amplifier 54.

The same effect can be achieved by using the reference resistive body 43 instead of the reference resistive body 33. However, the use of the reference resistive body 33 results in a great amount of cancellation of the drifts because the reference resistive body 33 is under the influence of vibrations of the reference lever 32. On the contrary, when the reference resistive body 43 according to the configuration shown in FIG. 6 is used, the reference lever 42 is not subjected to vibrations similar to those at the lever 3, the amount of drift cancellation is reduced accordingly.

While a circuit configuration for detecting displacement of the lever 3 using a resistive element has been described above, the amplitude, phase, and frequency of the lever 3 vary because the interaction between the sample and the scanning needle is affected by changes in the distance between them, the materials of them and the like. Therefore, a circuit configuration may be employed in which displacement of the lever 3 is detected based on the amplitude, phase, and frequency of a detection signal obtained from the resistive body. While a high signal-to-noise ratio is required for detection in such a manner, a circuit configuration as shown in FIG. 7 makes it possible to detect displacement of the lever 3 with high accuracy using the above-described various wave-detecting methods because it allows measurement with a high signal-to-noise ratio.

FIG. 8 is a block diagram showing a configuration of a scanning probe apparatus embodying the present invention. A sample 60 is placed on a three-dimensional sample stage 73, and a scanning needle 4 of a probe 1 having a configuration according to the invention is provided above the sample 60 in a face-to-face relationship. A detecting portion 71 is formed by a bias circuit and an amplifier. It applies bias and excitation signals to the probe 1 and amplifies a signal generated as a result of distortion of the probe. A calculation portion 72 performs calculations to obtain a desired signal and converts changes in amplitude, phase, frequency, and the like into a displacement signal S1. A control portion 75 controls an actuator drive amplifier 70 such that the displacement signal S1 approaches 0. The output signal of the control portion 75 is supplied to a controller 77 as a luminance signal (Z-signal). A scan signal generating portion 76 supplies a jog signal for jogging the sample 60 in X- and Y-directions to the actuator drive amplifier 70 and supplies a raster scan signal to the controller 77. The controller 77 may be easily configured using a personal computer or the like. It has the functions of controlling the apparatus as a whole with control signals and displaying X-, Y-, and Z-signals as a three-dimensional image. Further, arithmetic processes may be performed by dedicated software to convert the signals, thereby providing various kinds of information on a surface.

The present invention makes it possible to perform measurement with higher sensitivity and accuracy compared to conventional methods relying upon external excitation because variation of the transmission of vibrations is eliminated and excitation can be preferably controlled. With a configuration in which displacement is detected using a bias signal having a periodically changing vibration amplitude like an alternating current, displacement can be detected using amplitude, phase, and frequency components of a detection signal obtained by a resistive body, which allows measurement with high resolution and performance.

What is claimed is:

1. A scanning probe apparatus for measuring a characteristic of a sample by scanning a lever of a probe across the sample surface, the apparatus comprising: a probe having a deflectable lever, a base for supporting the lever, and a resistive body provided on the lever to excite the lever in response to a periodic bias signal applied to the resistive body; and a circuit for supplying an AC bias signal to the resistive body to vibrate the lever and operate the probe in a dynamic measurement mode.

2. A scanning probe apparatus according to claim 1; further comprising a circuit for monitoring a resistance value of the resistive body to detect deflection of the lever.

3. A scanning probe apparatus according to claim 2; further comprising a reference lever supported by the base and provided in the vicinity of the lever, the reference lever having a reference resistive body having the same configuration as the resistive body so that the reference resistive body may be used as an element for temperature compensation to improve accuracy in the detection of deflection of the lever.

4. A scanning probe apparatus according to claim 3; wherein the circuit supplies the same AC bias signal to the resistive body and the reference resistive body.

5. A scanning probe apparatus according to claim 1; further comprising a second resistive body provided on the lever and having a resistance value that varies in response to deflection of the lever so that the resistance of the second resistive body may be monitored to detect deflection of the lever.

6. A scanning probe apparatus according to claim 5; further comprising a circuit for detecting the resistance value of the second resistance body and producing an output signal that varies in response to deflection of the lever.

7. A scanning probe apparatus according to any one of claims 2, 5 and 3; further comprising a circuit for detecting at least one of changes in the amplitude, phase, and frequency of a signal that varies in accordance with changes in the resistance value of the resistive body for detecting deflection of the lever.

8. A scanning probe apparatus according to claim 1; wherein the lever is integrally formed with and extends from the base.

9. A scanning probe apparatus according to claim 8; wherein a free end of the lever has a sharpened tip.

10. A scanning probe apparatus according to claim 9; further comprising a needle disposed at a free end of the lever distal from the base.

11. A scanning probe apparatus according to claim 1; wherein the lever has a central axis which is the same as that of the base.

12. A scanning probe apparatus according to claim 11; wherein the base and the lever are formed in a single substrate.

13. A scanning probe apparatus according to claim 11; wherein the base and the lever are formed in a single substrate etched so that the base is thicker than the lever.

14. A scanning probe apparatus having a self-exciting and self-detecting probe, the apparatus comprising: a probe having a lever, a base for supporting the lever, and a resistive body provided on the lever, a circuit for supplying a current intermittently to vibrate the lever and operate the probe in a dynamic measurement mode by exciting the lever to vary in resistance value of the resistive body in response to deflection of the lever; and a circuit for monitoring deflection of the probe by monitoring the resistance value of the resistive body.

15. A scanning probe apparatus having a self-exciting and self-detecting probe, the apparatus comprising: a probe having a lever, a base for supporting the lever, a first resistive body provided on the lever for excitation of the lever in response to a current applied to the first resistive body, a second resistive body provided on the lever and having a resistance value that varies in response to deflection of the lever; a circuit for supplying the same AC bias signal to the first and second resistive bodies to vibrate the lever and operate the probe in a dynamic measurement mode; and a circuit for monitoring deflection of the lever by monitoring the resistance value of the second resistive body.

* * * * *